United States Patent
Niesen et al.

(10) Patent No.: US 10,502,840 B2
(45) Date of Patent: Dec. 10, 2019

(54) OUTLIER DETECTION FOR SATELLITE POSITIONING SYSTEM USING VISUAL INERTIAL ODOMETRY

(71) Applicant: QUALCOMM Incorporated, San Diego, CA (US)

(72) Inventors: Urs Niesen, Summit, NJ (US); Venkatesan Nallampatti Ekambaram, Somerville, NJ (US); Lionel Jacques Garin, Palo Alto, CA (US); Jubin Jose, Belle Mead, NJ (US); Xinzhou Wu, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 699 days.

(21) Appl. No.: 15/014,009

(22) Filed: Feb. 3, 2016

(65) Prior Publication Data

US 2017/0219716 A1    Aug. 3, 2017

(51) Int. Cl.
*G01S 19/47*    (2010.01)
*G01C 21/16*    (2006.01)
(Continued)

(52) U.S. Cl.
CPC ............ *G01S 19/47* (2013.01); *G01C 21/165* (2013.01); *G01S 5/163* (2013.01); *G01S 19/22* (2013.01); *G01S 19/426* (2013.01)

(58) Field of Classification Search
CPC .... G01S 19/47; G01S 19/49; G01S 19/20–22; G01S 5/163; G01C 21/165
See application file for complete search history.

(56) References Cited

U.S. PATENT DOCUMENTS 7,706,976 B1 *    4/2010    Peake ..................... G01S 19/41
                                                                340/988
8,374,786 B2    2/2013    Buros
(Continued)

FOREIGN PATENT DOCUMENTS

| EP | 2180331 A2 * | 4/2010 | ............. G01S 19/34 |
|---|---|---|---|
| WO | 2010088290 A1 | 8/2010 | |
| WO | 2013149149 A1 | 10/2013 | |

OTHER PUBLICATIONS

L. Fu et al., Vision-Aided RAIM: A New Method for GPS Integrity Monitoring in Approach and Landing Phase, Sensors 2015, vol. 15, p. 22854-22873 (Year: 2015).*
(Continued)

*Primary Examiner* — Bernarr E Gregory
*Assistant Examiner* — Fred H Mull
(74) *Attorney, Agent, or Firm* — Robert Reid

(57) ABSTRACT

A method of determining a position of a mobile platform includes obtaining a plurality of pseudorange measurements from multiple time epochs of a satellite navigation system (SPS) and obtaining a plurality of visual-inertial odometry (VIO) velocity measurements from a VIO system. Each time epoch of the SPS includes at least one pseudorange measurement corresponding to a first satellite and at least one pseudorange measurement corresponding to a second satellite. The method also includes combining the plurality of pseudorange measurements with the plurality of VIO velocity measurements to identify one or more outlier pseudorange measurements in the plurality of pseudorange measurements. The one or more outlier pseudorange measurements are then discarded from the plurality of pseudorange measurements to generate a remaining plurality of pseudorange measurements. The position of the mobile platform is then computed based on the remaining
(Continued)

plurality of pseudorange measurements and the plurality of VIO velocity measurements.

19 Claims, 5 Drawing Sheets

(51) Int. Cl.
    *G01S 5/16*     (2006.01)
    *G01S 19/22*     (2010.01)
    *G01S 19/42*     (2010.01)

(56) References Cited

U.S. PATENT DOCUMENTS

| | | |
|---|---|---|
| 9,031,782 B1 | 5/2015 | Lemay et al. |
| 2012/0323438 A1* | 12/2012 | Wendel ............... G01S 5/0027 |
| | | 701/36 |
| 2013/0154879 A1* | 6/2013 | Ramakrishnan ........ G01S 19/20 |
| | | 342/357.25 |
| 2014/0225770 A1* | 8/2014 | Riley .................... G01S 5/0236 |
| | | 342/357.22 |
| 2015/0201180 A1* | 7/2015 | Mourikis ............. H04N 13/296 |
| | | 348/46 |
| 2018/0164124 A1* | 6/2018 | Viswanathan ....... G01C 21/165 |

OTHER PUBLICATIONS

S. Gaglione, How does a GNSS receiver estimate velocity?, insideGNSS, Mar./Apr. 2015 (Year: 2019).*
P.D. Groves, Principles of GNSS, Inertial, and Multisensor Integrated Navigation Systems, Artech House, 2013 (Year: 2013).*
Jiang Z., et al., "GNSS NLOS and Multipath Error Mitigation using Advanced Multi-Constellation Consistency Checking with Height Aiding," Proceedings of the 25th International Technical Meeting of the Satellite Division of the Institute of Navigation (Ion Gnss), 2012, pp. 79-88.

* cited by examiner

OUTLIER DETECTION FOR SATELLITE POSITIONING SYSTEM USING VISUAL INERTIAL ODOMETRY

FIELD OF DISCLOSURE

This disclosure relates generally to the use of satellite positioning systems (SPS), and in particular, but not exclusively, relates to outlier detection for the SPS using visual inertial odometry (VIO).

BACKGROUND

Mobile platforms offer increasingly sophisticated capabilities associated with the motion and/or position location sensing of the mobile platform. New software applications, such as, for example, those related to personal productivity, collaborative communications, social networking, and/or data acquisition, may utilize motion and/or position sensors to provide new features and services to consumers.

Such motion and/or position determination capabilities may be provided using Satellite Positioning Systems (SPS), such as a global positioning system (GPS). GPS can provide absolute positioning with accuracies on the order of a few meters in open sky conditions. However, the performance of GPS drastically degrades if large parts of the sky are obstructed. This occurs, for example, in so-called urban canyon scenarios, where the GPS receiver may be located in an area with one or more tall buildings. In these urban canyon scenarios GPS positions may be off by as much as 50 m. These large positioning errors are prohibitive in applications such as vehicular automation (i.e., Advanced Driver Assistance Systems—ADAS) and robotics (e.g., drone positioning and navigation). The large positioning errors in urban canyons are mainly caused by non-line-of-sight (NLOS) observations. Such observations result when the line-of-sight (LOS) path from an SPS receiver to a satellite is blocked by nearby obstacles, such tall buildings. In such situations, the SPS receiver may erroneously track a reflected version of the satellite signal (i.e., NLOS) rather than tracking the satellite signal directly (i.e., LOS). Urban canyon scenarios are challenging because many of the GPS measurements at a particular time epoch may actually be such erroneous NLOS measurements.

SUMMARY

The following presents a simplified summary relating to one or more aspects and/or embodiments associated with the mechanisms disclosed herein for outlier detection for a satellite positioning system (SPS) using visual inertial odometry (VIO). As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary presents certain concepts relating to one or more aspects and/or embodiments relating to the mechanisms disclosed herein to detect outliers for an SPS using VIO measurements in a simplified form to precede the detailed description presented below.

According to one aspect, a method of determining a position of a mobile platform includes obtaining a plurality of pseudorange measurements from multiple time epochs of a satellite navigation system (SPS) and obtaining a plurality of visual-inertial odometry (VIO) velocity measurements from a VIO system. Each time epoch of the SPS includes at least one pseudorange measurement corresponding to a first satellite and at least one pseudorange measurement corresponding to a second satellite. The method also includes combining the plurality of pseudorange measurements with the plurality of VIO velocity measurements to identify one or more outlier pseudorange measurements in the plurality of pseudorange measurements. The one or more outlier pseudorange measurements are then discarded from the plurality of pseudorange measurements to generate a remaining plurality of pseudorange measurements. The position of the mobile platform is then computed based on the remaining plurality of pseudorange measurements and the plurality of VIO velocity measurements.

According to another aspect, an apparatus for determining a position of a mobile platform includes means for obtaining a plurality of pseudorange measurements from multiple time epochs of a satellite navigation system (SPS), where each time epoch includes at least one pseudorange measurement corresponding to a first satellite and at least one pseudorange measurement corresponding to a second satellite. The apparatus also includes means for obtaining a plurality of visual-inertial odometry (VIO) velocity measurements from a VIO system and means for combining the plurality of pseudorange measurements with the plurality of VIO velocity measurements to identify one or more outlier pseudorange measurements in the plurality of pseudorange measurements. The apparatus further includes means for discarding the one or more outlier pseudorange measurements from the plurality of pseudorange measurements to generate a remaining plurality of pseudorange measurements and means for computing the position of the mobile platform based on the remaining plurality of pseudorange measurements and the plurality of VIO velocity measurements.

According to yet another aspect, an apparatus for determining a position of a mobile platform includes at least one processor and at least one memory coupled to the at least one processor. The at least one processor and the at least one memory are configured to direct the apparatus to: (i) obtain a plurality of pseudorange measurements from multiple time epochs of a satellite navigation system (SPS), wherein each time epoch includes at least one pseudorange measurement corresponding to a first satellite and at least one pseudorange measurement corresponding to a second satellite; (ii) obtain a plurality of visual-inertial odometry (VIO) velocity measurements from a VIO system; (iii) combine the plurality of pseudorange measurements with the plurality of VIO velocity measurements to identify one or more outlier pseudorange measurements in the plurality of pseudorange measurements; (iv) discard the one or more outlier pseudorange measurements from the plurality of pseudorange measurements to generate a remaining plurality of pseudorange measurements; and (v) compute the position of the mobile platform based on the remaining plurality of pseudorange measurements and the plurality of VIO velocity measurements.

According to another aspect, a non-transitory computer-readable storage medium includes computer-executable instructions recorded thereon. Executing the computer-executable instructions on one or more processors causes the one or more processors to: (i) obtain a plurality of pseudorange measurements from multiple time epochs of a satellite navigation system (SPS), wherein each time epoch includes at least one pseudorange measurement corresponding to a first satellite and at least one pseudorange measurement corresponding to a second satellite; (ii) obtain a plurality of visual-inertial odometry (VIO) velocity measurements from a VIO system; (iii) combine the plurality of pseudorange measurements with the plurality of VIO velocity measurements to identify one or more outlier pseudorange measurements in the plurality of pseudorange measurements; (iv) discard the one or more outlier pseudorange measurements from the plurality of pseudorange measurements to generate a remaining plurality of pseudorange measurements; and (v) compute the position of the mobile platform based on the remaining plurality of pseudorange measurements and the plurality of VIO velocity measurements.

Other objects and advantages associated with the mechanisms disclosed herein to detect outliers for a satellite positioning system (SPS) using visual inertial odometry (VIO) described herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
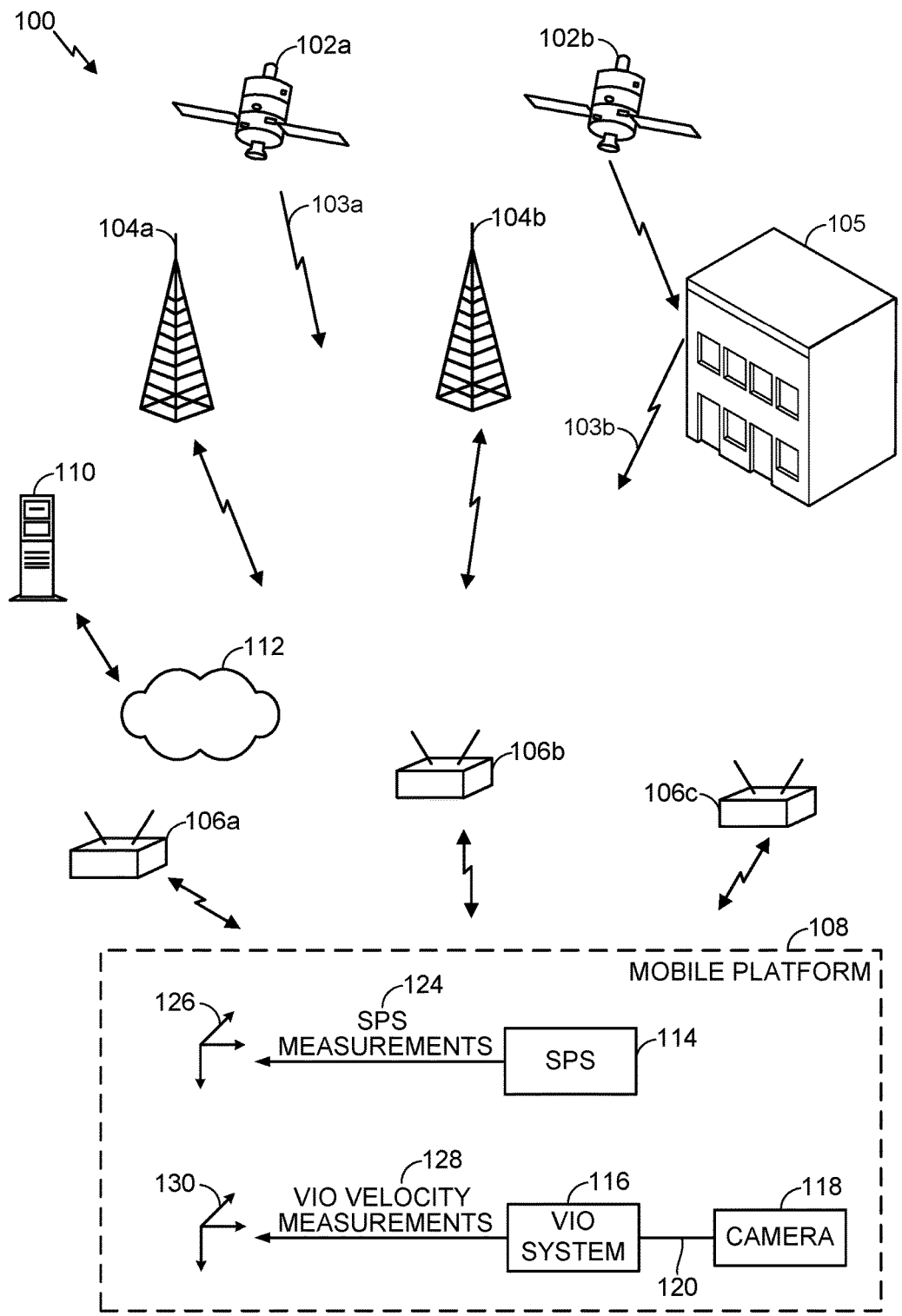
FIG. 1 illustrates an example operating environment for a mobile platform that can determine position using one or more techniques, according to one aspect of the disclosure.

According to one aspect of the disclosure, FIG. 1 illustrates an exemplary operating environment 100 for a mobile platform 108 that can determine its position using one or more techniques. Embodiments are directed to a mobile platform 108 which may determine its position utilizing data from both a Satellite Positioning System (SPS) 114 and a Visual Inertial Odometer (VIO) system 116. The SPS measurements 124 generated by the SPS 114 may include one or more range-rate measurements (e.g., GPS Doppler measurements), one or more pseudorange measurements, and/or one or more SPS velocity measurements. The range-rate measurements may contain information, such as GPS Doppler measurements, that allow a determination of a velocity of the mobile platform 108. The pseudorange measurements may provide information about the distance between the SPS 114 and a respective satellite. The range-rate measurements and the pseudorange measurements may both be corrupted by an unknown receiver clock bias or its derivative, as will be discussed in more detail below. The SPS velocity measurements are representative of a velocity of the mobile platform 108.

The VIO system 116 utilizes several sequential images 120 captured by a camera 118 to estimate a relative position, velocity, acceleration, and/or orientation of the mobile platform 108. The camera 118 may include a single monocular camera, a stereo camera, and/or an omnidirectional camera. In operation, the VIO system 116 acquires the images 120 generated by the camera 118 in order to generate the VIO velocity measurements 128. In one aspect, the VIO system 116 may apply one or more image processing techniques to the images 120, detect one or more features, match those features across multiple frames to construct an optical flow, and estimate motion of the mobile platform 108 based on the optical flow. The VIO system 116 then generates VIO velocity measurements 128 that represent an estimated velocity of the mobile platform 108 based on the estimated motion.

By combining the VIO velocity measurements 128 with the SPS measurements 124, the mobile platform 108 may increase the accuracy of position determinations of the mobile platform 108. However, the SPS measurements 124 and the VIO velocity measurements 128 may be each made with respect to separate coordinate systems. For example, the SPS measurements 124 may be with respect to a global reference frame 126, such as an Earth-Centered, Earth-Fixed (ECEF) coordinate system, such as the WGS84 coordinate system used with GPS, while the VIO velocity measurements 128 may be with respect to a separate local reference frame 130. While the global reference frame 126 may be known and common to any system using the same satellite positioning network, the local reference frame 130 may depend, in part, on the specific orientation of the mobile platform 108. That is, the local reference frame 130 may change depending on the position and/or orientation of the mobile platform 108 within environment 100. Thus, in order to combine the VIO velocity measurements 128 with the SPS measurements 124, the mobile platform 108 may align local reference frame 130 with the global reference frame 126. In one aspect, the mobile platform 108 determines one or more orientation parameters (e.g., rotation matrix) to align the local reference frame 130 with the global reference frame 126 based on the SPS measurements 124 and the VIO velocity measurements 128.

The operating environment 100 may contain one or more different types of wireless communication systems and/or wireless positioning systems. In the embodiment shown in FIG. 1, one or more Satellite Positioning System (SPS) satellites 102a, 102b may be used as an independent source of position information for the mobile platform 108. The SPS 114 of mobile platform 108 may include one or more dedicated SPS receivers specifically designed to receive signals 103a and 103b for deriving geo-location information from the SPS satellites 102a, 102b. For example, in one aspect, the SPS 114 may be configured to generate one or more pseudorange measurements based on the signals 103a and 103b. As shown in FIG. 1, signal 103a may be considered a line-of-sight (LOS) signal, as the path from the satellite 102a to mobile platform 108 is unobstructed such that the signal 103a is received at SPS 114 directly from satellite 102a. However, signal 103b may be considered a non-line-of-sight (NLOS) signal, as the path from satellite 102b is interrupted by a structure, such as building 105. The signal 103b that is received by SPS 114 is a reflected signal. Thus, any pseudorange measurements performed by SPS 114 based on signal 103b may be erroneous. Such NLOS signals (i.e., signal 103b) result in outlier pseudorange measurements that may disrupt any position determinations made by the mobile platform 108. Accordingly, the mobile platform 108 may be configured to detect and disregard such outlier pseudorange measurements. As will be discussed in more detail below, the mobile platform 108 may detect which pseudorange measurements are outlier pseudorange measurements by using, in part, the VIO velocity measurements 128.

The operating environment 100 may also include one or more Wide Area Network Wireless Access Points (WAN-WAPs) 104a, 104b, which may be used for wireless voice and/or data communication, and as another source of independent position information for the mobile platform 108. The WAN-WAPs 104a-104b may be part of a wide area wireless network (WWAN), which may include cellular base stations at known locations, and/or other wide area wireless systems, such as, for example, Worldwide Interoperability for Microwave Access (WiMAX) (e.g., IEEE 802.16). The WWAN may include other known network components which are not shown in FIG. 1 for simplicity. Typically, each of the WAN-WAPs 104a-104b within the WWAN may operate from fixed positions, and provide network coverage over large metropolitan and/or regional areas.

The operating environment 100 may further include one or more Local Area Network Wireless Access Points (LAN-WAPs) 106a, 106b, 106c, which may be used for wireless voice and/or data communication, as well as another independent source of position data. The LAN-WAPs can be part of a Wireless Local Area Network (WLAN), which may operate in buildings and perform communications over smaller geographic regions than a WWAN. Such LAN-WAPs 106a-106c may be part of, for example, Wi-Fi networks (802.11x), cellular piconets and/or femtocells, Bluetooth networks, etc.

The mobile platform 108 may derive position information from any one or more of the SPS satellites 102a, 102b, the WAN-WAPs 104a-104b, and/or the LAN-WAPs 106a-106c. Each of the aforementioned systems can provide an independent estimate of the position for the mobile platform 108 using different techniques. In some embodiments, the mobile platform 108 may combine the solutions derived from each of the different types of access points to improve the accuracy of the position data. When deriving position using the SPS satellites 102a, 102b, the mobile platform 108 may utilize a receiver specifically designed for use with the SPS that extracts position, using conventional techniques, from a plurality of signals 103a-103b transmitted by SPS satellites 102a, 102b.

SPS satellites 102a and 102b are part of a satellite system that typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground-based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein satellite systems used herein may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each WAN-WAPs 104a-104b may take the form of base stations within a digital cellular network, and the mobile platform 108 may include a cellular transceiver and processor that can exploit the base station signals to derive position. Such cellular networks may include, but are not limited to, standards in accordance with GSM, CMDA, 2G, 3G, 4G, LTE, etc. It should be understood that digital cellular network may include additional base stations or other resources that may not be shown in FIG. 1. While WAN-WAPs 104a-104b may actually be moveable or otherwise capable of being relocated, for illustration purposes it will be assumed that they are essentially arranged in a fixed position.

The mobile platform 108 may perform position determination using known time-of-arrival (TOA) techniques such as, for example, Advanced Forward Link Trilateration (AFLT). In other embodiments, each WAN-WAP 104a-104b may comprise a WiMAX wireless networking base station. In this case, the mobile platform 108 may determine its position using TOA techniques from signals provided by the WAN-WAPs 104a-104b. The mobile platform 108 may determine positions either in a stand-alone mode, or using the assistance of a positioning server 110 and network 112 using TOA techniques. Furthermore, various embodiments may have the mobile platform 108 determine position information using WAN-WAPs 104a-104b, which may have different types. For example, some WAN-WAPs 104a-104b may be cellular base stations, and other WAN-WAPs 104a-104b may be WiMAX base stations. In such an operating environment, the mobile platform 108 may be able to exploit the signals from each different type of WAN-WAP 104a-104b, and further combine the derived position solutions to improve accuracy.

When deriving position using the WLAN, the mobile platform 108 may utilize TOA techniques with the assistance of the positioning server 110 and the network 112. The positioning server 110 may communicate to the mobile platform 108 through network 112. Network 112 may include a combination of wired and wireless networks which incorporate the LAN-WAPs 106a-106c. In one embodiment, each LAN-WAP 106a-106c may be, for example, a Wi-Fi wireless access point, which is not necessarily set in a fixed position and can change location. The position of each LAN-WAP 106a-106c may be stored in the positioning server 110 in a common coordinate system. In one embodiment, the position of the mobile platform 108 may be determined by having the mobile platform 108 receive signals from each LAN-WAP 106a-106c. Each signal may be associated with its originating LAN-WAP based upon some form of identifying information that may be included in the received signal (such as, for example, a MAC address). The mobile platform 108 may then sort the received signals based upon signal strength, and derive the time delays associated with each of the sorted received signals. The mobile platform 108 may then form a message which can include the time delays and the identifying information of each of the LAN-WAPs, and send the message via network 112 to the positioning sever 110. Based upon the received message, the positioning server 110 may then determine a position, using the stored locations of the relevant LAN-WAPs 106a-106c, of the mobile platform 108. The positioning server 110 may generate and provide a Location Configuration Indication (LCI) message to the mobile platform 108 that includes a pointer to the position of the mobile platform 108 in a local coordinate system. The LCI message may also include other points of interest in relation to the location of the mobile platform 108. When computing the position of the mobile platform 108, the positioning server 110 may take into account the different delays which can be introduced by elements within the wireless network.

The position determination techniques described above may be used for various wireless communication networks such as a WWAN, a WLAN, a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of a WWAN, WLAN and/or WPAN.

As used herein, mobile platform 108 may be a device such as a vehicle (manned or unmanned), a robot, a cellular or other wireless communication device, personal communication system (PCS) device, personal navigation device, Personal Information Manager (PIM), Personal Digital Assistant (PDA), laptop or other suitable mobile device that is capable of capturing images and navigating using internal sensors. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile platform."

Furthermore, in one embodiment, the mobile platform 108 may be suitably linked to a vehicle through one or more communication interfaces (e.g., a Bluetooth interface, an RF antenna, a wired connection, etc.) that enable the mobile platform 108 to read SPS measurements 124 and/or VIO velocity measurements obtained by the vehicle, itself. Furthermore, an application program interface (API) that supports communication between the mobile platform 108 and a vehicle may make the SPS measurements 124 and/or VIO velocity measurements 128, obtained by the vehicle, available to the mobile platform 108.

Figure 2:
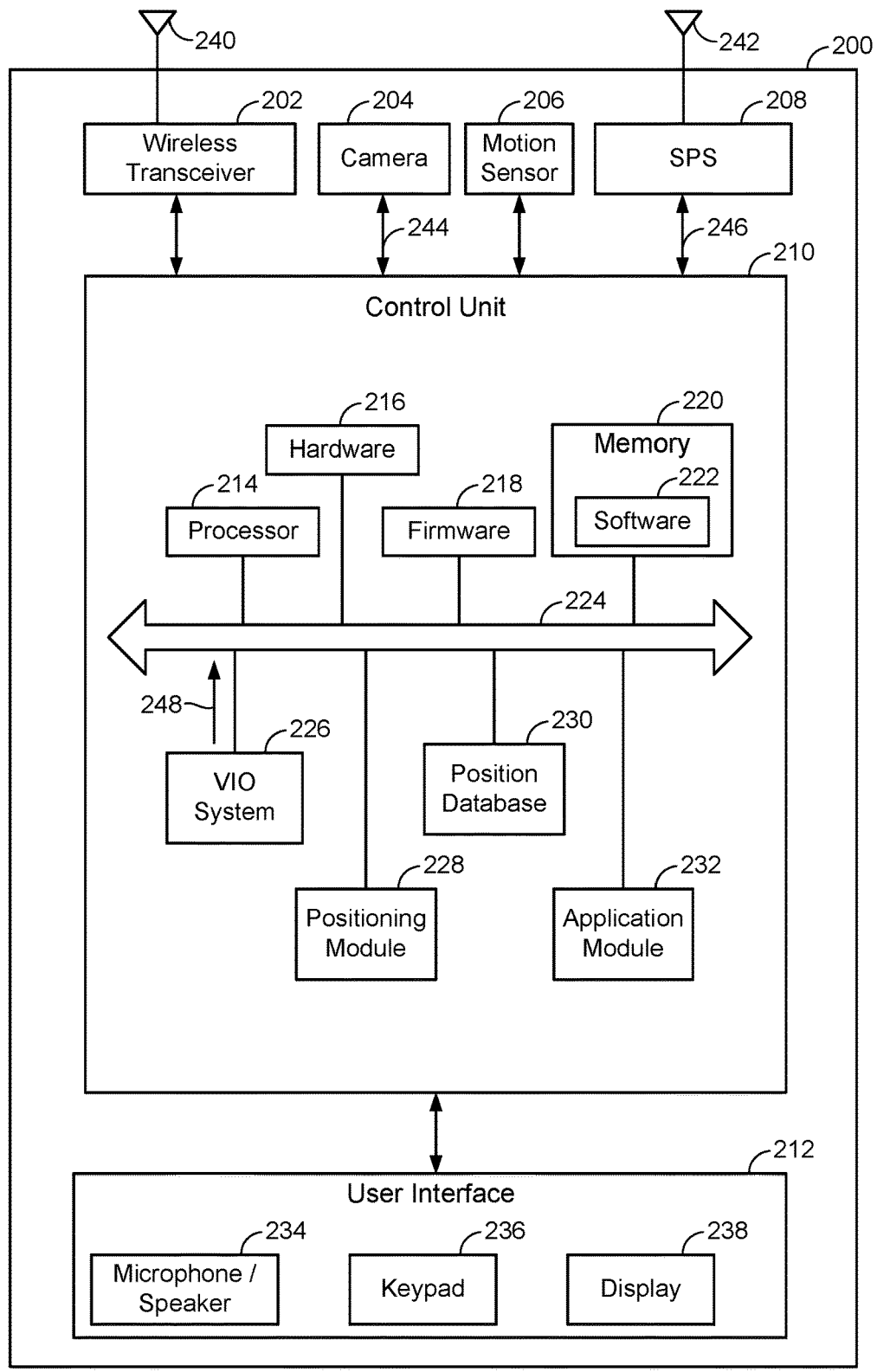
FIG. 2 illustrates an example mobile platform that may be used in an operating environment that can determine position using one or more techniques, according to one aspect of the disclosure.

FIG. 2 illustrates an example mobile platform 200 that may be used in an operating environment 100 that can determine position using one or more techniques, according to one aspect of the disclosure. Mobile platform 200 is one possible implementation of mobile platform 108 of FIG. 1.

The various features and functions illustrated in the diagram of FIG. 2 are connected together using a common data bus 224 which is meant to represent that these various features and functions are operatively coupled together. Those skilled in the art will recognize that other connections, mechanisms, features, functions, or the like, may be provided and adapted as necessary to operatively couple and configure an actual portable device. Further, it is also recognized that one or more of the features or functions illustrated in the example of FIG. 2 may be further subdivided or two or more of the features or functions illustrated in FIG. 2 may be combined.

The mobile platform 200 may include one or more wireless transceivers 202 that may be connected to one or more antennas 240. The wireless transceiver 202 may include suitable devices, hardware, and/or software for communicating with and/or detecting signals to/from WAN-WAPs 104a-104c, and/or directly with other wireless devices within a network. For example, the wireless transceiver 202 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (IEEE 802.16), etc. The wireless transceiver 202 may also include one or more local area network (LAN) transceivers that may be connected to one or more antennas 240. For example, the wireless transceiver 202 may include suitable devices, hardware, and/or software for communicating with and/or detecting signals to/from LAN-WAPs 106a-106c, and/or directly with other wireless devices within a network. In one aspect, the wireless transceiver 202 may include a Wi-Fi (802.11x) communication system suitable for communicating with one or more wireless access points; however in other aspects, the wireless transceiver 202 comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to LAN-WAPs 106a-106c and/or WAN-WAPs 104a-104b. Specifically, when the term "WAP" is used, it should be understood that embodiments may include a mobile platform 200 that can exploit signals from a plurality of LAN-WAPs 106a-106c, a plurality of WAN-WAPs 104a-104b, or any combination of the two. The specific type of WAP being utilized by the mobile platform 200 may depend upon the environment of operation. Moreover, the mobile platform 200 may dynamically select between the various types of WAPs in order to arrive at an accurate position solution. In other embodiments, various network elements may operate in a peer-to-peer manner, whereby, for example, the mobile platform 200 may be replaced with the WAP, or vice versa. Other peer-to-peer embodiments may include another mobile platform (not shown) acting in place of one or more WAP.

As shown in FIG. 2, mobile platform 200 may also include a camera 204. Camera 204 may be a single monocular camera, a stereo camera, and/or an omnidirectional camera. In one aspect, camera 204 is calibrated such that the camera parameters (e.g., focal length, displacement of the optic center, radial distortion, tangential distortion, etc.) are known. Camera 204 is coupled to control unit 210 to provide images 244 to the control unit 210.

The illustrated example of mobile platform 200 also includes a motion sensor 206. Motion sensor 206 may be coupled to control unit 210 to provide movement and/or orientation information which is independent of motion data derived from signals received by the wireless transceiver 202, the SPS 208, and the VIO system 226.

By way of example, the motion sensor 206 may include an accelerometer (e.g., a MEMS device), a gyroscope, a geomagnetic sensor (e.g., a compass), an altimeter (e.g., a barometric pressure altimeter), and/or any other type of movement detection sensor. Moreover, the motion sensor 206 may include a plurality of different types of devices and combine their outputs in order to provide motion information. For example, the motion sensor 206 may use a combination of a multi-axis accelerometer and orientation sensors to provide the ability to compute positions in 2-D and/or 3-D coordinate systems.

A Satellite Positioning System (SPS) 208 may also be included in the mobile platform 200. The SPS 208 may be connected to the one or more antennas 242 for receiving satellite signals. The SPS 208 may comprise any suitable hardware and/or software for receiving and processing SPS signals. The SPS 208 requests information and operations as appropriate from the other systems, and performs the calculations necessary to determine the mobile platforms 200 position using measurements obtained by any suitable SPS algorithm. In one aspect, SPS 208 is coupled to control unit 210 to provide one or more SPS measurements 246 to the control unit 210. In one example, the SPS measurements 246 are range-rate measurements, such as GPS Doppler range-rate measurements. In another example, SPS 208 is configured to determine an SPS velocity of the mobile platform 200 based on the range-rate measurements such that the SPS measurements 246 are the SPS velocity measurements. In yet another example, the SPS measurements 246 are the pseudorange measurements that are representative of a distance from the SPS 208 to a respective satellite (e.g., 102a, 102b). That is, SPS measurements 246 may include the range-rate measurements by themselves, the SPS velocity measurements by themselves, the pseudorange measurements themselves, and/or any combination of the three.

Mobile platform 200 also includes a control unit 210 that is connected to and communicates with the wireless transceiver 202, the camera 204, the motion sensor 206, the SPS 208, and user interface 212, if present. In one aspect, the control unit 210 accepts and processes images 244 received from the camera 204 as well as SPS measurements 246 received from SPS 208. Control unit 210 may be provided by a processor 214 and associated memory 220, hardware 216, firmware 218, and software 222.

The processor 214 may include one or more microprocessors, microcontrollers, and/or digital signal processors that provide processing functions, as well as other calculation and control functionality. The processor 214 may also include memory 220 for storing data and software instructions for executing programmed functionality within the mobile platform 200. The memory 220 may be on-board the processor 214 (e.g., within the same IC package), and/or the memory may be external memory to the processor 214 and functionally coupled over a data bus 224. The functional details associated with aspects of the disclosure will be discussed in more detail below.

Control unit 210 may further include a Visual Inertial Odometry (VIO) system 226, a positioning module 228, a position database 230, and an application module 232. VIO system 226 may be configured to generate VIO velocity measurements 248 in response to the images 244 received from camera 204. The positioning module 228 may be configured to determine a position of the mobile platform 200 based on one or more positioning techniques. As will be discussed in more detail below, positioning module 228 may be configured to determine a position of the mobile platform 200 by combining the VIO velocity measurements 248 with the SPS measurements 246. The position database 230 may be configured to store and update the position and/or orientation of the mobile platform 200. That is, as the control unit 210 determines a new position and/or orientation of the mobile platform 200, the position database 230 may be updated. The updated position and orientation information may then be provided, e.g., by displaying a digital map with the new position on the display 238 or by providing additional navigation instructions on the display and/or via speaker 234.

The application module 232 may be a process running on the processor 214 of the mobile platform 200, which requests position information from the positioning module 228. Applications typically run within an upper layer of the software architectures, and may include Indoor/Outdoor Navigation, Buddy Locator, Shopping and Coupons, Asset Tracking, and location Aware Service Discovery.

Processor 214, VIO system 226, positioning module 228, and position database 230 are illustrated separately for clarity, but may be a single unit and/or implemented in the processor 214 based on instructions in the software 222 which is run in the processor 214. Processor 214, VIO system 226, positioning module 228 can, but need not necessarily include, one or more microprocessors, embedded processors, controllers, application specific integrated circuits (ASICs), digital signal processors (DSPs), and the like. The term processor describes the functions implemented by the system rather than specific hardware. Moreover, as used herein the term "memory" refers to any type of computer storage medium, including long term, short term, or other memory associated with mobile platform 200, and is not to be limited to any particular type of memory or number of memories, or type of media upon which memory is stored.

The processes described herein may be implemented by various means depending upon the application. For example, these processes may be implemented in hardware 216, firmware 218, processor 214 in combination with software 222, or any combination thereof. For a hardware implementation, the processor 214 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or processor/software implementation, the processes may be implemented with modules (e.g., procedures, functions, and so on) that perform the functions described herein. Any non-transitory computer-readable medium tangibly embodying instructions may be used in implementing the processes described herein. For example, program code may be stored in memory 220 and executed by the processor 214. Memory 220 may be implemented within or external to the processor 214.

If implemented in firmware 218 and/or processor 214 with software 222, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The mobile platform 200 may include an optional user interface 212 which provides any suitable interface systems, such as a microphone/speaker 234, keypad 236, and display 238 that allows user interaction with the mobile platform 200. The microphone/speaker 234 provides for voice communication services using the wireless transceiver 202. The keypad 236 comprises any suitable buttons for user input. The display 238 comprises any suitable display, such as, for example, a backlit LCD display, and may further include a touch screen display for additional user input modes.

In one aspect, the mobile platform 200 is configured to determine a position of the mobile platform 200 by combining the SPS measurements 246 with the VIO velocity measurements 248 to improve accuracy of the position determination. However, as mentioned above, the SPS measurements 246 may include outlier pseudorange measurements that are due to non-line-of sight (NLOS) satellite signals (i.e., signal 103b). Thus, positioning module 228 of the control unit 210 may be configured to detect these outlier pseudorange measurements using, in part, the VIO velocity measurements 248. As will be described in more detail below, positioning module 228 may combine the pseudorange measurements (i.e., included in the SPS measurement 246) with the VIO velocity measurements 248, such that information from a large number to time epochs can be utilized to perform joint outlier detection and accurate position determination.

Figure 3:
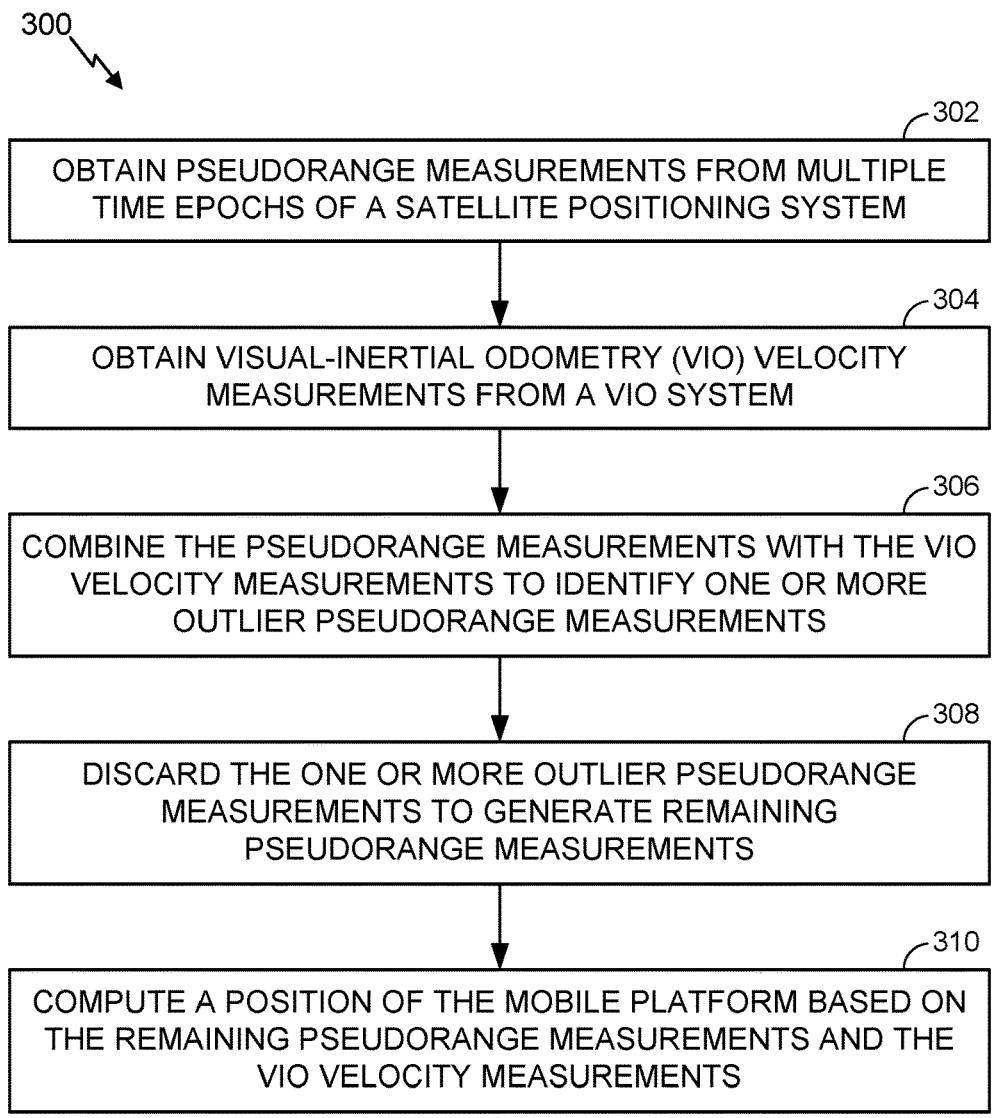
FIG. 3 illustrates an example process of determining a position of a mobile platform that includes outlier detection using Visual Inertial Odometry (VIO), according to one aspect of the disclosure.

FIG. 3 illustrates an example process 300 of determining a position of a mobile platform that includes outlier detection using Visual Inertial Odometry (VIO), according to one aspect of the disclosure. Process 300 may be performed by mobile platform 108 of FIG. 1 and/or mobile platform 200 of FIG. 2.

In a process block 302, positioning module 228 obtains pseudorange measurements 246 from multiple time epochs of SPS 208. In one aspect, the SPS 208 provides the raw pseudorange measurements from different satellites (e.g., satellite 102a, 102b) during each time epoch of a length of one second. That is, each time epoch includes at least one pseudorange measurement corresponding to a first satellite (e.g., satellite 102a) and at least one pseudorange measurement corresponding to a second satellite (e.g., satellite 102b).

In a process block 304, the positioning module 228 obtains VIO velocity measurements 248 from VIO system 226. The VIO system 226 may utilize the images 244 generated by camera 204 as well as data provided by one or more of the motion sensors 206 (e.g., accelerometer and gyroscope) to generate VIO velocity measurements 248. The VIO velocity measurements 248 generated by the VIO system 226 may be a vector of velocities and rotation matrices at each time instant along with estimates of the variances. The rate at which the VIO velocity measurements 248 are generated by VIO system 226 may be around 100 per second, which is much higher than the rate of the SPS measurements 246 generated by SPS 208, which is around 1 per second. The rotation matrices included in the VIO velocity measurements 248 describe the camera 204 orientation at the current time instant with respect to an initial camera reference frame. In some aspects, the VIO velocity measurements 248 are very accurate and have a drift of around 1% as a function of distance, i.e., an error of 1 m over 100 m. In one aspect, the VIO velocity measurements 248 are with respect to a local reference frame 130, while the range-rate measurements obtained from SPS 208 are with respect to a global reference frame 126. Thus, positioning module 228 may be configured to determine an orientation parameter, such as a rotation matrix, to align the local reference frame 130 with the global reference frame 126. In one aspect, aligning the local reference frame 130 with the global reference frame 126 includes translating the VIO velocity measurements 248 to the global reference frame 126 based on the rotation matrix.

In process block 306, the positioning module 228 combines the pseudorange measurements obtained from the SPS 208 via the SPS measurements 246 with the VIO velocity measurements 248 in order to identify one or more outlier pseudorange measurements. For example, the positioning module 228 may determine that a pseudorange measurement based on received satellite signal 103a is a LOS pseudorange measurement, while a pseudorange measurement based on received satellite signal 103b is an outlier pseudorange measurement as satellite signal 103b is a NLOS satellite signal. As will be discussed in more detail below, combining the pseudorange measurements with the VIO velocity measurements 248 may include determining a positional displacement of the mobile platform 200 between a current time epoch and a previous time epoch based on the VIO velocity measurements 248. The displacement may be applied to propagate previous tentative positions and/or pseudorange measurements to the current time epoch such that the positioning module 228 may apply one or more algorithms to determine whether any of the current pseudorange measurements are outlier pseudorange measurements.

Thus, in process block 308, the positioning module 228 discards the one or more outlier pseudorange measurements identified in process block 306 to generate a remaining set of pseudorange measurements. In a process block 310, the positioning module 228 computes a position of the mobile platform 200 based on the remaining set of pseudorange measurements and the VIO velocity measurements 248.

Figure 4:
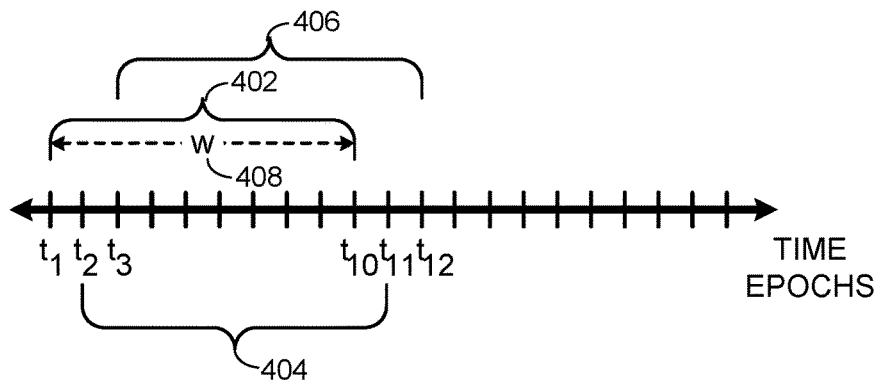
FIG. 4 illustrates a sliding window of time with respect to multiple time epochs, according to one aspect of the disclosure.

In some applications, the positioning module 228 is configured to recompute the position of the mobile platform 200 at regular intervals. Hence, certain aspects include the positioning module 228 determining the position in a continuous fashion using a sliding window of time. FIG. 4 illustrates a sliding window of time 402-406 with respect to multiple time epochs, according to one aspect of the disclosure. As shown in FIG. 4, the positioning module 228 may determine a first position of the mobile platform 200 over a window of time 402 that extends from time epoch $t_1$ to time epoch $t_{10}$. The window of time for the next determination of the position may then slide to window of time 404, where the positioning module 228 determines the position using time epochs $t_2$ through $t_{11}$. Similarly, a third determination of the position may be performed by utilizing the window of time 406 that extends between time epoch $t_3$ and $t_{12}$. Thus, the positioning module 228 obtains the VIO velocity measurements 248 and the SPS measurements 246 (e.g., pseudorange measurements) over a sliding window of time Such that the positioning module 228 may continuously determine the position of the mobile platform 200.

Furthermore, as mentioned above, the positioning module 228 may track one or more past tentative positions and/or corresponding pseudorange measurements. Thus, computing a position of the mobile platform at time epoch t10 using window 402 may include utilizing past tentative positions determined at time epochs t1-t9, as well as their corresponding pseudorange measurements. Similarly, computing a position of the mobile platform 200 at time epoch t11 using window 404 may include utilizing past tentative positions determined at time epochs t2-t10 and their corresponding pseudorange measurements.

As shown in FIG. 4, the window of time 402 includes a size 408 that dictates the number of time epochs used by the positioning module 228 when determining the position of the mobile platform 200. In some aspects, the size 408 of the windows of time 402-406 can be made adaptive depending on a magnitude of movement of the mobile platform 200, where larger movements result in a smaller the size 408 of the window of time.

Figure 5:
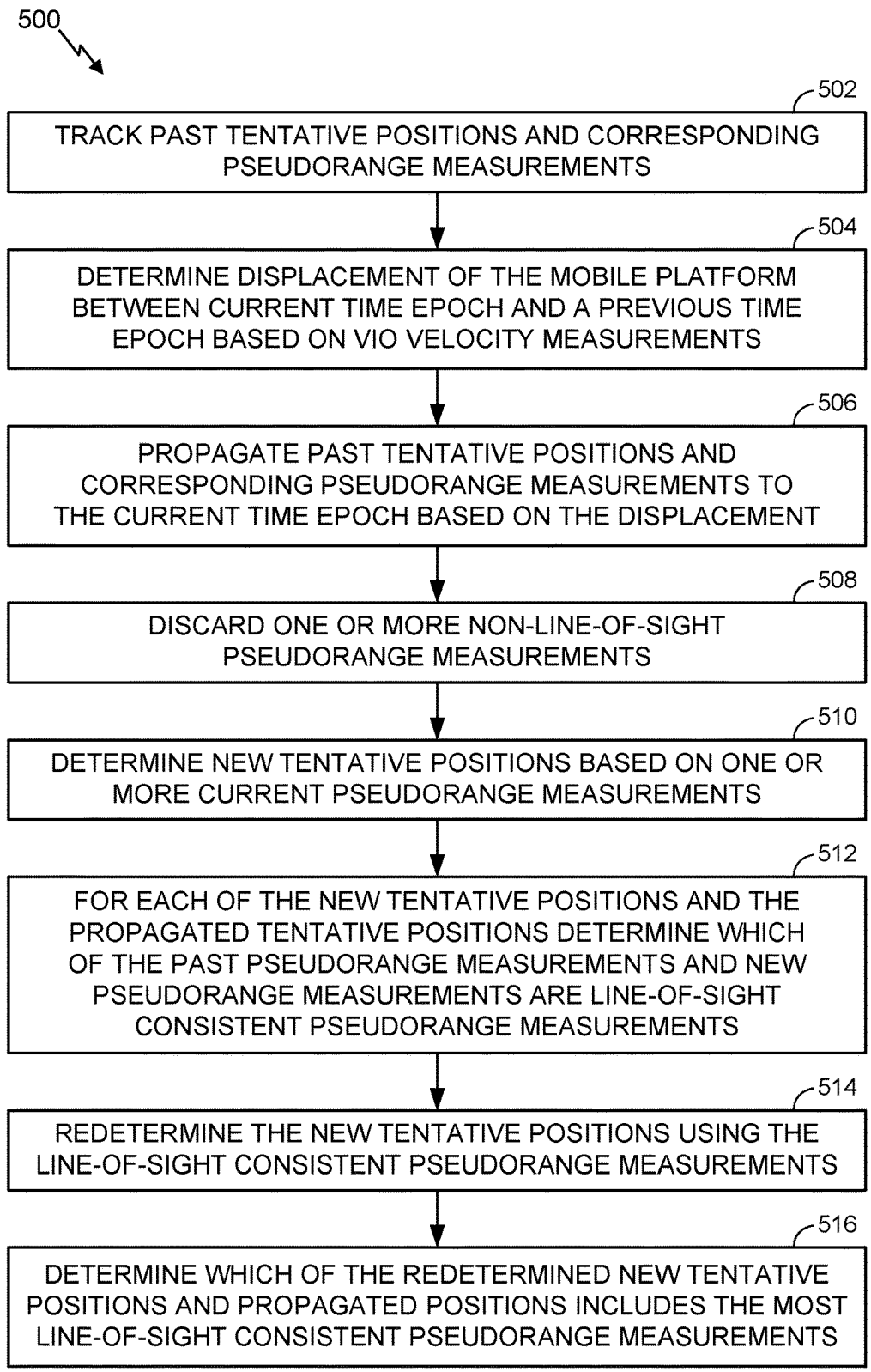
FIG. 5 illustrates another example process of determining a position of a mobile platform that includes outlier detection using VIO, according to one aspect of the disclosure.

FIG. 5 illustrates another example process 500 of determining a position of a mobile platform that includes outlier detection using VIO, according to one aspect of the disclosure. Process 500 may be performed by mobile platform 108 of FIG. 1 and/or mobile platform 200 of FIG. 2.

As mentioned above, positioning module 228 obtains pseudorange measurements from the SPS 208 by way of SPS measurements 246. In one aspect, the tropospheric, ionospheric, and satellite clock biases are assumed to be corrected in these pseudorange measurements either through standard models used in single-point solutions or from network data. The corrected pseudorange measurements may be modeled as:

$$\rho_s(t) \triangleq \|x(t) - x_s(t)\| + b(t) + v_s(t) + z_s(t), \qquad \text{EQ (1)}$$

where $x(t)$ is the mobile platform 200 position, $x_s(t)$ is the satellite (e.g., 102a, 102b) position, $b(t)$ is the receiver clock bias, $v_s(t) \geq 0$ is the NLOS noise, and $z_s(t)$ captures multipath and receiver noise with standard deviation 6. The NLOS noise results from blockages and reflections from buildings that are far away and the multipath noise is due to local reflections. In one aspect, the pseudorange measurements with nonzero NLOS noise $v_s(t)>0$ as outlier range-rate measurements.

In one aspect, the process 500 described herein recursively applies a Random Sample and Consensus (RanSaC) approach to determining outliers and/or a position of the mobile platform 200. Thus, in a process block 502, the positioning module 228 tracks past tentative positions as well as their corresponding pseudorange measurements. The past tentative positions may be derived by positioning module 228 performing process 500 at previous time epochs. The pseudorange measurements associated with the past tentative positions are pseudorange measurements that are line-of-sight (LOS) consistent with the past tentative positions (i.e., these pseudorange measurements constitute the consensus set in RanSaC terminology).

Next, in a process block 504, the positioning module 228 determines a displacement of the mobile platform 200 between a current time epoch and a previous time epoch based on at least one of the VIO velocity measurements 248. For example, since $x(t)$ is the position of the mobile platform 200 at time epoch t, the displacement between two time epochs $t-1$ and $t$ may be given by, $$\Delta x(t-1) \triangleq x(t)-x(t-1) \approx \sum_{i:\tau_i \in [t-1,t)} (\tau_i-\tau_{i-1})\hat{R}^T u_V(\tau_i) \quad \text{EQ (2)}$$

Here, in equation (2), $\hat{R}$ is a rotation matrix relating the SPS global reference frame 126 and the VIO local reference frame 130, and $v_V(\tau)$ is the VIO velocity measurement 248 at time $\tau$. At time t, the positioning module 228 has access to the estimates of the displacements $\{\Delta x(\tau)\}_{\tau<t}$ for all time epochs up to time t.

The positioning module 228 may compute a coarse position estimate $\tilde{x}(t)$ of $x(t)$ from all (possible NLOS-noise corrupted) pseudoranges. The coarse position estimate may be assumed to be within 200 meters from the true position. Using this coarse position, positioning module 228 can approximate the distance between the mobile platform 200 and the satellite s as:

$$\|x(t)-x_s(t)\| \approx \|\tilde{x}(t)-x_s(t)\| + \nabla_s^T(t)(x(t)-\tilde{x}(t)) \quad \text{EQ (3b)}$$

where, $$\nabla_s(t) \triangleq \frac{(x(t)-\tilde{x}(t))}{\|(x(t)-\tilde{x}(t))\|} \quad \text{EQ (3c)}$$

is the unit vector from the satellite s to the coarse estimate $\tilde{x}(t)$ of the mobile platform 200 position $x(t)$.

Furthermore, let T be the current time epoch and assume that positioning module 228 has access to all pseudorange measurements from time epochs t in the window $\{T-W+1, T-W+2, \ldots T\}$ of size W (e.g., see window 402 of size W 408). With the SPS measurements 246 and the VIO velocity measurements 248 aligned, as discussed above, positioning module 228 has access from the VIO velocity measurements 248 to measurements of the displacement $\Delta x(t-1)$s between time epochs $t-1$ and t as defined above in equation (2). Since these VIO velocity measurements 248 are accurate for a properly chosen window size W, positioning module 228 may ignore any noise in them and may assume to have access to the displacements $\Delta x(t-1)$ directly. Using these displacements, positioning module 228 can propagate forward the pseudorange measurements from past (prior) time epochs $t<T$ to time T. Thus, $$x(t) = x(T) - \sum_{\tau=t}^{T-1} \Delta x(\tau), \quad \text{EQ (3d)}$$

so that, $$\nabla_s^T(t)(x(t)-\tilde{x}(t)) = \nabla_s^T(t)\left(x(T) - \sum_{\tau=t}^{T-1} \Delta x(\tau) - \tilde{x}(t)\right) \quad \text{EQ (3e)}$$

The modified pseudorange measurement may be defined as:

$$Y_s^{(T)}(t) \triangleq \rho_s(t) - \|\tilde{x}(t)-x_s(t)\| + \nabla_s^T(t)\left(\sum_{\tau=t}^{T-1} \Delta x(\tau) - \tilde{x}(t)\right) \quad \text{EQ (3f)}$$

From equation (3a), equation (4) follows as:

$$y_s^{(T)}(t) \approx \nabla_s^T(t)x(T) + b(t) + v_s(t) + z_s(t) \quad \text{EQ (4)}$$

for all time epochs t and all satellites s. This modified pseudorange measurement $y_s^{(T)}(t)$ at the time $t \in \{T-W+1, T-W+2, \ldots T\}$ provides information about the position $x(T)$ at the current time epoch T. The following further description utilizes these modified pseudorange measurements. Furthermore, as mentioned above, the positioning module 228 may track a number of tentative positions, which each provide an estimate of the current position $x(T)$, which are referred to herein as $\hat{x}(T)$.

In a process block 506, the positioning module 228 propagates past tentative positions and corresponding pseudorange measurements to the current time epoch based on the displacement determined in process block 504. In one aspect, positioning module 228 propagates the past tentative positions and modified pseudorange measurements within a window W. Each tentative position $\hat{x}(T-1)$ may be propagated as follows:

$$\hat{x}(T)=\hat{x}(T-1)+\Delta x(T-1). \quad \text{EQ (5)}$$

For each $t \in \{T-W+1, T-W+2, \ldots T-1\}$ and each satellite s, the modified pseudorange measurement $y_s^{(T-1)}(t)$ as used in the previous time epoch T−1 is propagated as $$y_s^{(T)}(t)=y_s^{(T)}(t)+\nabla_s^T(t)\Delta x(T-1) \quad \text{EQ (6)}$$

Process block 506 of propagation may ensure that all past pseudorange measurements in the window can be then used to estimate the current position $x(T)$ of the mobile platform 200.

Next, in process block 508, the positioning module 228 discards one or more current pseudorange measurements corresponding to the current time epoch if the one or more current pseudorange measurements are not line-of-sight (LOS) consistent with any of the propagated tentative positions determined in process block 508. This consistency check makes use of the property that NLOS noise is assumed to be in [0,200] m.

For example, assume that satellite s is LOS at time epoch T, then, with high probability, there exists a position $\hat{x}(T)$ and a clock bias $\hat{b}(T)$ satisfying:

$$y_s^{(T)}(t) \in \nabla_s^T(t)\hat{x}(T)+\hat{b}(T) \pm \kappa\sigma,$$

$$y_{s'}^{(T)}(t) \geq \nabla_{s'}^T(t)\hat{x}(T)+\hat{b}(T) - \kappa\sigma, \forall s' \neq s$$

$$y_{s'}^{(T)}(t) \leq \nabla_{s'}^T(t)\hat{x}(T)+\hat{b}(T)+200+\kappa\sigma, \forall s' \neq s$$

$$x(T) \in \tilde{x}(T) \pm 200, \quad \text{EQ (7)}$$

where the addition/subtraction $\tilde{x}(T) \pm 200$ is understood to be component wise, and where $\kappa$ is a fixed parameter typically in the interval [1,5]. Here the first inequality enforces that satellite s is LOS, the second and third inequalities enforce that for all other satellites s the NLOS noise is in [0,200] m, and the last inequality enforces that the position is within 200 m of the coarse position estimate $\tilde{x}(T)$.

The above-noted set of inequalities can be expressed as a linear program in the unknowns $\hat{x}(T)$ and $\hat{b}(T)$. Feasibility of this linear program can be computed efficiently using for example the simplex method. If there exists no solution $(\hat{x}(T), \hat{b}(T))$ to this linear program, then with high probability the satellite s cannot be LOS, and the corresponding pseudorange measurement can be discarded.

In a process block 510, the positioning module 228 determines one or more new tentative positions based on one or more current pseudorange measurements corresponding to the current time epoch. That is, in process block 510, the positioning module 228 tries to create new tentative positions $\hat{x}(T)$ to be tracked. In one example, positioning module 228 randomly picks three time epochs within the window $\{T-W+1, T-W+2, \ldots T\}$, say for example, time epochs $t_1$, $t_2$, and $t_3$. For each time epoch $t_k$, positioning module 228 picks two satellites $s_k$ and $s'_k$. Positioning module 228 may then compute the single difference $y_{s_k}^{(T)}(t_k) - y_{s'_k}^{(T)}(t_k)$. From equation (4), each such single difference satisfies the approximate equality:

$$y_{s_k}^{(T)}(t_k) - y_{s'_k}^{(T)}(t_k) \approx \nabla_{s_k s'_k}^T(t_k) x(T) + v_{s_k}(t_k) - v_{s'_k}(t_k) + z_{s_k}(t_k) + z_{s_k}(t_k) - z_{s'_k}(t_k) \qquad \text{EQ (8)}$$

with $$\nabla_{ss'}(t) \triangleq \nabla_s(t) - \nabla_{s'}(t) \qquad \text{EQ (9)}$$

The positioning module 228 may then assume that the six satellites $\{s_k, s'_k\}_{k=1}^{3}$ at times $\{t_k\}_{k=1}^{3}$, respectively, are all line of sight. Under this assumption, all corresponding NLOS noises $v_{s_k}$, $v_{s'_k}$ are equal to zero, and hence the single differences satisfy, $$y_{s_k}^{(T)}(t_k) - y_{s'_k}^{(T)}(t_k) \approx \nabla_{s_k s'_k}^T(t_k) x(T) + z_{s_k}(t_k) - z_{s'_k}(t_k) \qquad \text{EQ (10)}$$

From these single differences, the positioning module 228 can solve for the unknown position $x(T)$ using linear least-squares (which in this case of three equalities and three unknowns is equivalent to a matrix inversion), where $\hat{x}(T)$ is the resulting estimate.

In one aspect, before the positioning module 228 adopts the new estimate $\hat{x}(T)$ as a new tentative position to be tracked, the positioning module 228 may ensure that it is consistent with other observations at the time epochs $\{t_k\}_{k=1}^{3}$ in the sense that the resulting NLOS noises are all in the range [0,200]. In other words, positioning module 228 may need to verify that for each $k \in \{1, 2, 3\}$ and every pair of satellites $(s_k, s''_k)$ or $(s'_k, s''_k)$ during time epoch $t_k$ (where $s_k$ and $s'_k$ are the same as discussed above), that $$y_{s_k}^{(T)}(t_k) - y_{s''_k}^{(T)}(t_k) - \nabla_{s_k s''_k}^T(t_k) \hat{x}(T) \in [-\kappa \sigma, 200 + \kappa \sigma] \qquad \text{EQ (11)}$$

and similarly for $(s'_k, s''_k)$. If any of these constraints are violated, then $\hat{x}(T)$ is not a valid position with high probability, and positioning module 228 may discard it. Otherwise $\hat{x}(T)$ is added to a list of tentative positions to be tracked in the future.

Positioning module 228 may repeat this procedure of randomly sampling six satellites a number of times. The number of repetitions may be chosen such that the probability of picking six LOS satellites is reasonably large.

Next, in process block 512, for each of the one or more new tentative positions and each of the plurality of propagated tentative positions, the positioning module 228 may determine which of the past pseudorange measurements and the one or more new pseudorange measurements are LOS consistent pseudorange measurements. For example, consider one of the tentative positions $\hat{x}(T)$ being tracked, and assume that it is the correct position of the mobile platform 200. Also consider a time epoch t within the window $\{T-W+1, T-W+2, T\}$. By the nonnegativity of the NLOS noise, it is needed to have a high probability that $$y_{s_k}^{(T)}(t) - \nabla_s^T(t) \hat{x}(T) \geq \hat{b}(t) - \kappa \sigma \qquad \text{EQ (12)}$$

for all satellites s. This gives an upper bound on any block bias $\hat{b}(t)$ consistent with this tentative position. Thus, in order to minimize the number of LOS-consistent pseudorange measurements, positioning module 228 may choose a value of $\hat{b}(t)$ to be equal to the smallest of these upper bounds. For example, positioning module 228 may set, $$\hat{b}(t) \triangleq \min_s (y_s^{(T)}(t) - \nabla_s^T(t) \hat{x}(T)) \qquad \text{EQ (13)}$$

Having access to a tentative position $\hat{x}(T)$ and having solved for a corresponding clock bias $\hat{b}(t)$, the positioning module 228 can now solve for the total noise $v_s + z_s(t)$ using equation (14) as follows, $$v_s(t) + z_s(t) = y_s^{(T)}(t) - \nabla_s^T(t) \hat{x}(T) - \hat{b}(t) \qquad \text{EQ (14)}$$

If the result of equation (14) is larger than a threshold, say $\kappa \sigma$, then the total noise likely contains a nonzero NLOS noise term, and the modified pseudorange measurement $y_s^{(T)}(t)$ is determined to be an outlier pseudorange measurement for the tentative position $\hat{x}(T)$. All other modified pseudorange measurements in the window W are declared as inliers for this tentative position.

This same procedure describe above, of finding LOS-consistent pseudorange measurements is then repeated for all tentative positions (past propagated tentative positions and new tentative positions). Those tentative positions with few LOS-consistent pseudorange measurements can be discarded and no longer tracked by positioning module 228.

It is of note that a given modified pseudorange measurement $y_s^{(T)}(t)$ can be an outlier for one tentative position and an inlier for another. Furthermore, the same modified pseudorange measurement can be an inlier for more than one tentative position.

In a process block 514, the positioning module 228 redetermines the one or more new tentative positions using the LOS-consistent pseudorange measurements determined in process block 512. For example, consider again one of the tentative positions $\hat{x}(T)$ being tracked. From process block 512, the collection of modified pseudorange measurements $y_s^{(T)}(t)$ for various values of time epoch t and satellite s that are LOS-consistent with $\hat{x}(T)$ are now known. For further discussion, this set of modified pseudorange measurements may be denoted by Y.

The positioning module 228 may now recompute a better estimate of the tentative positions $\hat{x}(T)$ using all the inliers Y that correspond to it. Consider a modified pseudorange measurement $y_s^{(T)}(t)$ in the inlier set Y. If the inlier hypothesis is correct, the corresponding NLOS noise $v_s(t)$ is equal to zero. Under this hypothesis, the approximation of equation (4) for $y_s^{(T)}(t)$ becomes:

$$y_s^{(T)}(t) \approx \nabla_s^T(t) x(T) + b(t) + z_s(t) \qquad \text{EQ (15)}$$

The above is a set of |Y| linear equations with W+3 unknowns $x(T)$ (i.e., the current position of mobile platform 200) and $\{b(T-W+1), b(T-W+2), \ldots b(T)\}$ (i.e., the clock biases during the window of W past time epochs). Positioning module 228 can solve for the unknowns using the standard linear least-squares approach and then update the tentative positions $\hat{x}(T)$ with this newly computed estimate of $x(T)$.

Positioning module 228 may repeat this procedure of updating for all the tentative positions being tracked. Since a distinct inlier set Y is associated with each tentative position, the resulting updated position estimates will in general be difference, each reflecting a different hypothesis about which set of pseudorange measurements are inliers. If after this re-estimation step, two tentative positions are too close (e.g., a distance less than κσ), then one of them can be discarded. In one aspect, before discarding, the positioning module 228 may need to ensure that the tentative position with the largest number of associated LOS pseudorange measurements is kept.

Recall that the displacements are computed using the VIO velocity measurements 248 which need to be translated to be in the same coordinate frame as the SPS measurements 246. The corresponding rotation matrix may be estimated from the coarse position estimates. In process block 514, this rotation matrix can be re-estimated using only the pseudorange measurements corresponding to the pseudorange measurements that are declared as inliers for the tentative position $\hat{x}(T)$. If this approach is taken, the positioning module 228 may track a tentative rotation matrix $\hat{R}(T)$ together with each tentative position $\hat{x}(T)$.

In process block 516, the positioning module 228 determines which of the redetermined new tentative positions includes the most line-of-sight consistent pseudorange measurements at the current time epoch in order to decide the final position of the mobile platform 200. In one aspect, the redetermined new tentative positions may include both the past propagated tentative positions and/or the newly determine tentative positions. Thus, positioning module 228 may cluster these tentative positions in order to make a determination as to the position of the mobile platform 200. This clustering can be performed using Gaussian kernel density estimation. The cluster with the most number of points is chosen as the true position, while all other points are rejected as outliers.

As pointed out above with reference to process block 514, each of the tracked tentative positions $\hat{x}(T)$ corresponds to a different hypothesis about which set of pseudorange measurements are LOS. Thus, in another example, positioning module 228 may select the tentative position that explains most of the pseudorange measurements in the window $(T-W+1, T-W+2, \ldots, T)$ as LOS. In other words, the positioning module 228 may select the value of $\hat{x}(T)$ with the largest cardinality |Y| of the associated set of inliers. This $\hat{x}(T)$ is declared by positioning module 228 to be the final estimator for the mobile platform position in time epoch T.

Figure 6:
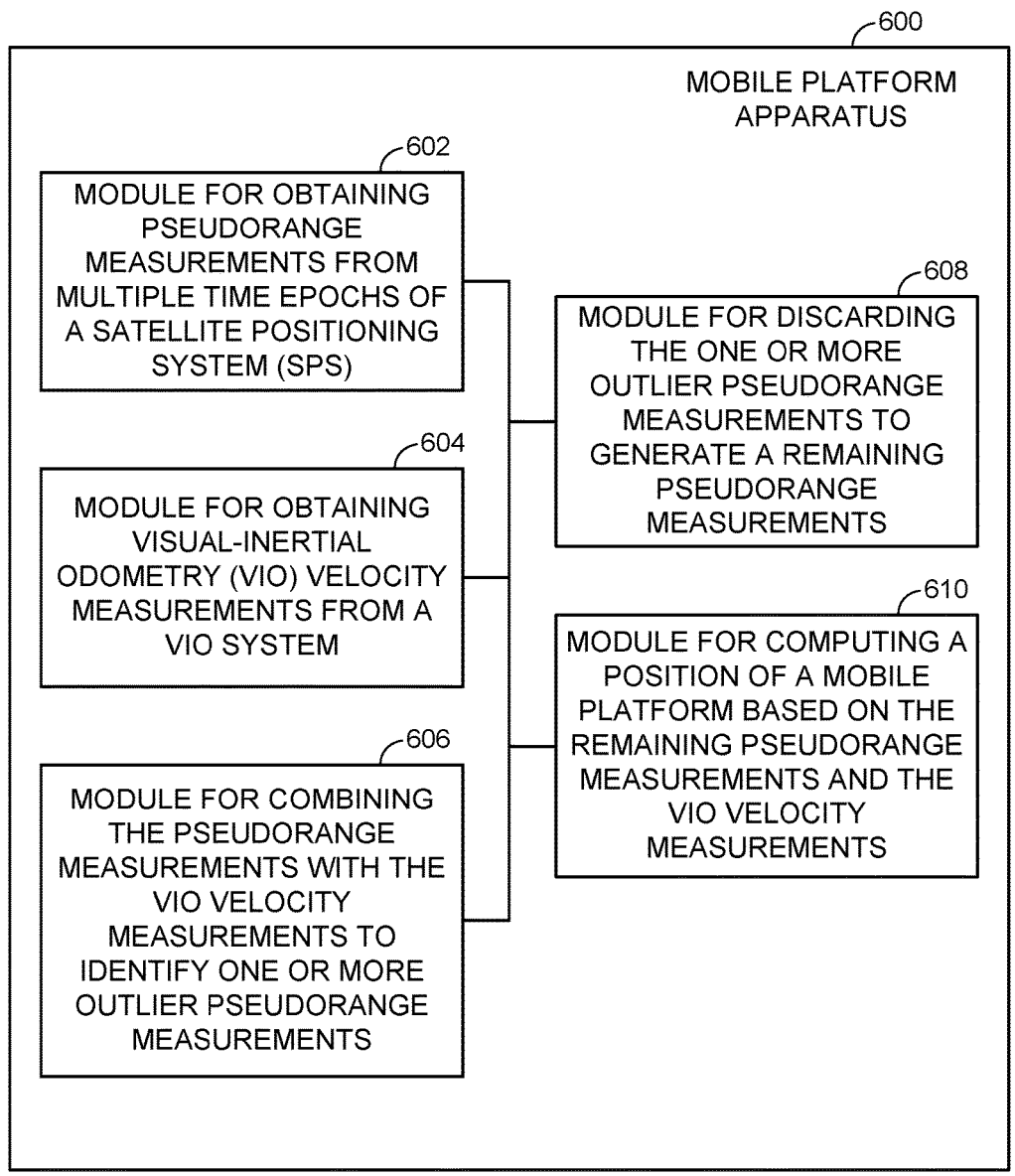
FIG. 6 illustrates several sample aspects of components that may be employed in a mobile platform configured to support the detection of outliers in a Satellite Positioning System (SPS) using VIO, as taught herein.

FIG. 6 illustrates several sample aspects of components that may be employed in a mobile platform apparatus 600 configured to support the detection of outliers in a Satellite Positioning System (SPS) using VIO, as taught herein. Mobile platform apparatus 600 is one possible implementation of mobile platform 108 of FIG. 1 and/or mobile platform 200 of FIG. 2.

A module 602 for obtaining pseudorange measurements from multiple time epochs of a satellite positioning system may correspond at least in some aspects to, for example, a SPS 208 and/or positioning module 228 of FIG. 2. A module 604 for obtaining visual-inertial odometry (VIO) velocity measurements from a VIO system may correspond at least in some aspects to, for example, VIO system 226 and/or positioning module 228 of FIG. 2. A module 606 for combining the pseudorange measurements with the VIO velocity measurements to identify one or more outlier pseudorange measurements may correspond at in some aspects to, for example, positioning module 228 and/or processor 214, of FIG. 2. A module 608 for discarding the one or more outlier pseudorange measurements to generate remaining pseudorange measurements may correspond at in some aspects to, for example, positioning module 228 and/or processor 214, of FIG. 2. A module 610 for computing a position of a mobile platform based on the remaining pseudorange measurements and the VIO velocity measurements may correspond at in some aspects to, for example, positioning module 228 and/or processor 214, of FIG. 2.

The functionality of the modules 602-610 of FIG. 6 may be implemented in various ways consistent with the teachings herein. In some designs, the functionality of these modules 602-610 may be implemented as one or more electrical components. In some designs, the functionality of these modules 602-610 may be implemented as a processing system including one or more processor components. In some designs, the functionality of these modules 602-610 may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 6, as well as other components and functions described herein, may be implemented using any suitable means. Such means also may be implemented, at least in part, using corresponding structure as taught herein. For example, the components described above in conjunction with the "module for" components of FIG. 6 also may correspond to similarly designated "means for" functionality. Thus, in some aspects, one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of continuously determining a position of a mobile platform, the method comprising:
   obtaining a plurality of pseudorange measurements from multiple time epochs of a satellite navigation system (SPS) over a sliding window of time by an SPS receiver of the mobile platform, wherein each time epoch includes at least one pseudorange measurement corresponding to a first satellite and at least one pseudorange measurement corresponding to a second satellite, wherein the mobile platform is capable of navigating using internal sensors, and the plurality of pseudorange measurements are with respect to a global reference frame of the SPS;
   obtaining a plurality of visual-inertial odometry (VIO) velocity measurements from a VIO system of the mobile platform over the sliding window of time, wherein the mobile platform includes a camera for capturing images, and wherein each VIO velocity measurement of the plurality of VIO velocity measurements is with respect to a local reference frame of the VIO system and includes a vector of velocities and a rotation matrix, the rotation matrix for aligning the local reference frame with the global reference frame;
   combining the plurality of pseudorange measurements with the plurality of VIO velocity measurements to identify one or more outlier pseudorange measurements in the plurality of pseudorange measurements;
   discarding the one or more outlier pseudorange measurements from the plurality of pseudorange measurements to generate a remaining plurality of pseudorange measurements; and
   computing the position of the mobile platform based on the remaining plurality of pseudorange measurements and the plurality of VIO velocity measurements.

2. The method of claim 1, further comprising:
   determining a displacement of the mobile platform between a current time epoch and a previous time epoch based on at least one of the plurality of VIO velocity measurements;
   propagating a plurality of past tentative positions to the current time epoch based on the displacement to generate a plurality of propagated tentative positions;
   determining one or more new tentative positions based on one or more current pseudorange measurements corresponding to the current time epoch; and
   clustering the plurality of propagated tentative positions and the one or more new tentative positions, wherein computing the position of the mobile platform is based on the clustering.

3. The method of claim 2, further comprising:
   discarding the one or more current pseudorange measurements corresponding to the current time epoch if the one or more current pseudorange measurements are not line-of-sight consistent with any of the plurality of propagated tentative positions.

4. The method of claim 2, further comprising:
   tracking a plurality of past pseudorange measurements corresponding to the plurality of past tentative positions; and
   for each of the one or more new tentative positions and each of the plurality of propagated tentative positions, determining which of the past pseudorange measurements and one or more new pseudorange measurements are line-of-sight consistent pseudorange measurements.

5. The method of claim 4, further comprising:
redetermining the one or more new tentative positions using the line-of-sight consistent pseudorange measurements, wherein computing the position of the mobile platform comprises determining which of the redetermined one or more new tentative positions and propagated tentative positions includes the most line-of-sight consistent pseudorange measurements at the current time epoch.

6. The method of claim 1, further comprising:
tracking tentative positions and corresponding pseudorange measurements for each time epoch in the sliding window of time.

7. The method of claim 1, further comprising adjusting a size of the sliding window of time based on a magnitude of movement of the mobile platform.

8. The method of claim 7, further comprising: decreasing the size of the sliding window of time in response to an increase in the magnitude of movement of the mobile platform.

9. The method of claim 1, wherein the rotation matrix included in the VIO velocity measurement describes an orientation of the camera with respect to an initial camera reference frame.

10. An apparatus for continuously determining a position of a mobile platform, comprising:
means for obtaining a plurality of pseudorange measurements from multiple time epochs of a satellite navigation system (SPS) over a sliding window of time from an SPS receiver of the mobile platform, wherein each time epoch includes at least one pseudorange measurement corresponding to a first satellite and at least one pseudorange measurement corresponding to a second satellite, wherein the mobile platform is capable of navigating using internal sensors, and the plurality of pseudorange measurements are with respect to a global reference frame of the SPS;
means for obtaining a plurality of visual-inertial odometry (VIO) velocity measurements from a VIO system of the mobile platform over the sliding window of time, wherein the mobile platform includes a camera for capturing images, and wherein each VIO velocity measurement of the plurality of VIO velocity measurements is with respect to a local reference frame of the VIO system and includes a vector of velocities and a rotation matrix, the rotation matrix for aligning the local reference frame with the global reference frame;
means for combining the plurality of pseudorange measurements with the plurality of VIO velocity measurements to identify one or more outlier pseudorange measurements in the plurality of pseudorange measurements;
means for discarding the one or more outlier pseudorange measurements from the plurality of pseudorange measurements to generate a remaining plurality of pseudorange measurements; and
means for computing the position of the mobile platform based on the remaining plurality of pseudorange measurements and the plurality of VIO velocity measurements.

11. The apparatus of claim 10, further comprising:
means for determining a displacement of the mobile platform between a current time epoch and a previous time epoch based on at least one of the plurality of VIO velocity measurements;
means for propagating a plurality of past tentative positions to the current time epoch based on the displacement to generate a plurality of propagated tentative positions;
means for determining one or more new tentative positions based on one or more current pseudorange measurements corresponding to the current time epoch; and
means for clustering the plurality of propagated tentative positions and the one or more new tentative positions, wherein computing the position of the mobile platform is based on the clustering.

12. The apparatus of claim 11, further comprising:
means for discarding the one or more current pseudorange measurements corresponding to the current time epoch if the one or more current pseudorange measurements are not line-of-sight consistent with any of the plurality of propagated tentative positions.

13. The apparatus of claim 11, further comprising:
means for tracking a plurality of past pseudorange measurements corresponding to the plurality of past tentative positions; and
for each of the one or more new tentative positions and each of the plurality of propagated tentative positions, means for determining which of the past pseudorange measurements and one or more new pseudorange measurements are line-of-sight consistent pseudorange measurements.

14. The apparatus of claim 13, further comprising:
means for redetermining the one or more new tentative positions using the line-of-sight consistent pseudorange measurements, wherein the means for computing the position of the mobile platform comprises means for determining which of the redetermined one or more new tentative positions and propagated tentative positions includes the most line-of-sight consistent pseudorange measurements at the current time epoch.

15. The apparatus of claim 10, further comprising:
means for tracking tentative positions and corresponding pseudorange measurements for each time epoch in the sliding window of time.

16. An apparatus for continuously determining a position of a mobile platform, comprising:
at least one processor; and
at least one memory coupled to the at least one processor, the at least one processor and the at least one memory being configured to direct the apparatus to:
obtain a plurality of pseudorange measurements from multiple time epochs of a satellite navigation system (SPS) over a sliding window of time from an SPS receiver of the mobile platform, wherein each time epoch includes at least one pseudorange measurement corresponding to a first satellite and at least one pseudorange measurement corresponding to a second satellite, wherein the mobile platform is capable of navigating using internal sensors, and the plurality of pseudorange measurements are with respect to a global reference frame of the SPS;
obtain a plurality of visual-inertial odometry (VIO) velocity measurements from a VIO system of the mobile platform over the sliding window of time, wherein the mobile platform includes a camera for capturing images, and wherein each VIO velocity measurement of the plurality of VIO velocity measurements is with respect to a local reference frame of the VIO system and includes a vector of velocities and a rotation matrix, the rotation matrix for aligning the local reference frame with the global reference frame;

combine the plurality of pseudorange measurements with the plurality of VIO velocity measurements to identify one or more outlier pseudorange measurements in the plurality of pseudorange measurements;

discard the one or more outlier pseudorange measurements from the plurality of pseudorange measurements to generate a remaining plurality of pseudorange measurements; and compute the position of the mobile platform based on the remaining plurality of pseudorange measurements and the plurality of VIO velocity measurements.

17. The apparatus of claim 16, wherein the at least one processor and the at least one memory are configured to direct the apparatus to:

determine a displacement of the mobile platform between a current time epoch and a previous time epoch based on at least one of the plurality of VIO velocity measurements;

propagate a plurality of past tentative positions to the current time epoch based on the displacement to generate a plurality of propagated tentative positions;

determine one or more new tentative positions based on one or more current pseudorange measurements corresponding to the current time epoch; and cluster the plurality of propagated tentative positions and the one or more new tentative positions, wherein computing the position of the mobile platform is based on the clustering.

18. The apparatus of claim 17, wherein the at least one processor and the at least one memory are configured to direct the apparatus to:

discard the one or more current pseudorange measurements corresponding to the current time epoch if the one or more current pseudorange measurements are not line-of-sight consistent with any of the plurality of propagated tentative positions.

19. The apparatus of claim 18, wherein the at least one processor and the at least one memory are configured to direct the apparatus to:

track a plurality of past pseudorange measurements corresponding to the plurality of past tentative positions;

for each of the one or more new tentative positions and each of the plurality of propagated tentative positions, determine which of the past pseudorange measurements and one or more new pseudorange measurements are line-of-sight consistent pseudorange measurements; and redetermine the one or more new tentative positions using the line-of-sight consistent pseudorange measurements, wherein computing the position of the mobile platform comprises determining which of the redetermined one or more new tentative positions and propagated tentative positions includes the most line-of-sight consistent pseudorange measurements at the current time epoch.

* * * * *